(12) United States Patent
Tsui

(10) Patent No.: US 7,254,182 B2
(45) Date of Patent: Aug. 7, 2007

(54) TRANSMITTER FOR OPERATING MULTIPLE DEVICES

(76) Inventor: Philip Y. W. Tsui, 2203-35 Kingsbridge Garden Circle, Skymark West 1, Mississauga, Ontario (CA) L5R 3Z5

( * ) Notice: Subject to any disclaimer, the term of this patent is extended or adjusted under 35 U.S.C. 154(b) by 993 days.

(21) Appl. No.: 10/193,525

(22) Filed: Jul. 9, 2002

(65) Prior Publication Data

US 2004/0008798 A1  Jan. 15, 2004

(51) Int. Cl.
*H04L 27/04* (2006.01)

(52) U.S. Cl. ............ 375/295; 375/219; 375/344; 340/825.69; 340/825.71; 455/151.1; 455/151.2; 455/92

(58) Field of Classification Search ............ 375/344, 375/219, 295; 455/93, 102, 115.2, 115.1, 455/69, 88, 151.1, 151.2; 240/5.26, 5.7, 240/5.71, 825.69, 825.72; 341/173, 179; 340/825.69, 825.71, 825.72

See application file for complete search history.

(56) References Cited

U.S. PATENT DOCUMENTS

| | | | |
|---|---|---|---|
| 4,535,333 A | 8/1985 | Twardowski | |
| 4,623,887 A | 11/1986 | Welles, II | |
| 4,626,848 A | 12/1986 | Ehlers | |
| 4,771,283 A | 9/1988 | Imoto | |
| 4,825,200 A | 4/1989 | Evans et al. | |
| 4,878,052 A | 10/1989 | Schulze | |
| 4,905,279 A | 2/1990 | Nishio | |
| 4,928,098 A | 5/1990 | Dannhaeuser | |
| 4,959,810 A | 9/1990 | Darbee et al. | |
| 4,999,622 A * | 3/1991 | Amano et al. ......... | 340/825.72 |
| 5,089,692 A | 2/1992 | Tonnesson | |
| 5,227,780 A | 7/1993 | Tigwell | |
| 5,379,453 A | 1/1995 | Tigwell | |
| 5,442,340 A | 8/1995 | Dykema | |
| 5,564,101 A | 10/1996 | Eisfeld et al. | |
| 5,600,324 A | 2/1997 | Reed et al. | |
| 5,619,190 A | 4/1997 | Duckworth et al. | |
| 5,661,804 A | 8/1997 | Dykema et al. | |
| 5,680,134 A | 10/1997 | Tsui | |
| 5,686,903 A | 11/1997 | Duckworth et al. | |
| 5,699,054 A | 12/1997 | Duckworth | |
| 5,699,055 A | 12/1997 | Dykema et al. | |
| 5,790,948 A | 8/1998 | Eisfeld et al. | |
| 5,793,300 A | 8/1998 | Suman et al. | |
| 5,815,086 A | 9/1998 | Ivie et al. | |
| 5,841,390 A | 11/1998 | Tsui | |
| 5,854,593 A * | 12/1998 | Dykema et al. ....... | 340/825.22 |
| 5,903,226 A | 5/1999 | Suman et al. | |
| 5,923,758 A | 7/1999 | Khamharn et al. | |

(Continued)

*Primary Examiner*—Temesghen Ghebretinsae
(74) *Attorney, Agent, or Firm*—Crowell & Moring LLP

(57) ABSTRACT

A transmitter that is programmable to transmit one or more identification or device codes, using one or more transmission formats, at one or more transmission frequencies to control one or more respective devices. In one embodiment, the transmitter includes a controller and memory for storing transmission values and corresponding transmission frequencies, where the transmission values may include multiple device codes and transmission formats. A subset of the transmission values and corresponding transmission frequencies stored in the memory are assigned to or associated with one or more actuation switches upon matching the transmission values in a sampled signal to a set of transmission values stored in memory. In one embodiment, the transmission values may correspond to either a fixed-code transmission format or a rolling-code transmission format.

14 Claims, 12 Drawing Sheets

U.S. PATENT DOCUMENTS

| | | |
|---|---|---|
| 5,969,637 A | 10/1999 | Doppelt et al. |
| 6,005,508 A | 12/1999 | Tsui |
| 6,008,735 A | 12/1999 | Chiloyan et al. |
| 6,025,785 A | 2/2000 | Farris et al. |
| 6,154,544 A | 11/2000 | Farris et al. |
| 6,169,492 B1 | 1/2001 | Dabbish |
| 6,243,000 B1 | 6/2001 | Tsui |
| 6,249,673 B1 | 6/2001 | Tsui |
| 6,359,558 B1 | 3/2002 | Tsui |
| 6,441,719 B1 | 8/2002 | Tsui |
| 6,556,813 B2 | 4/2003 | Tsui |

* cited by examiner

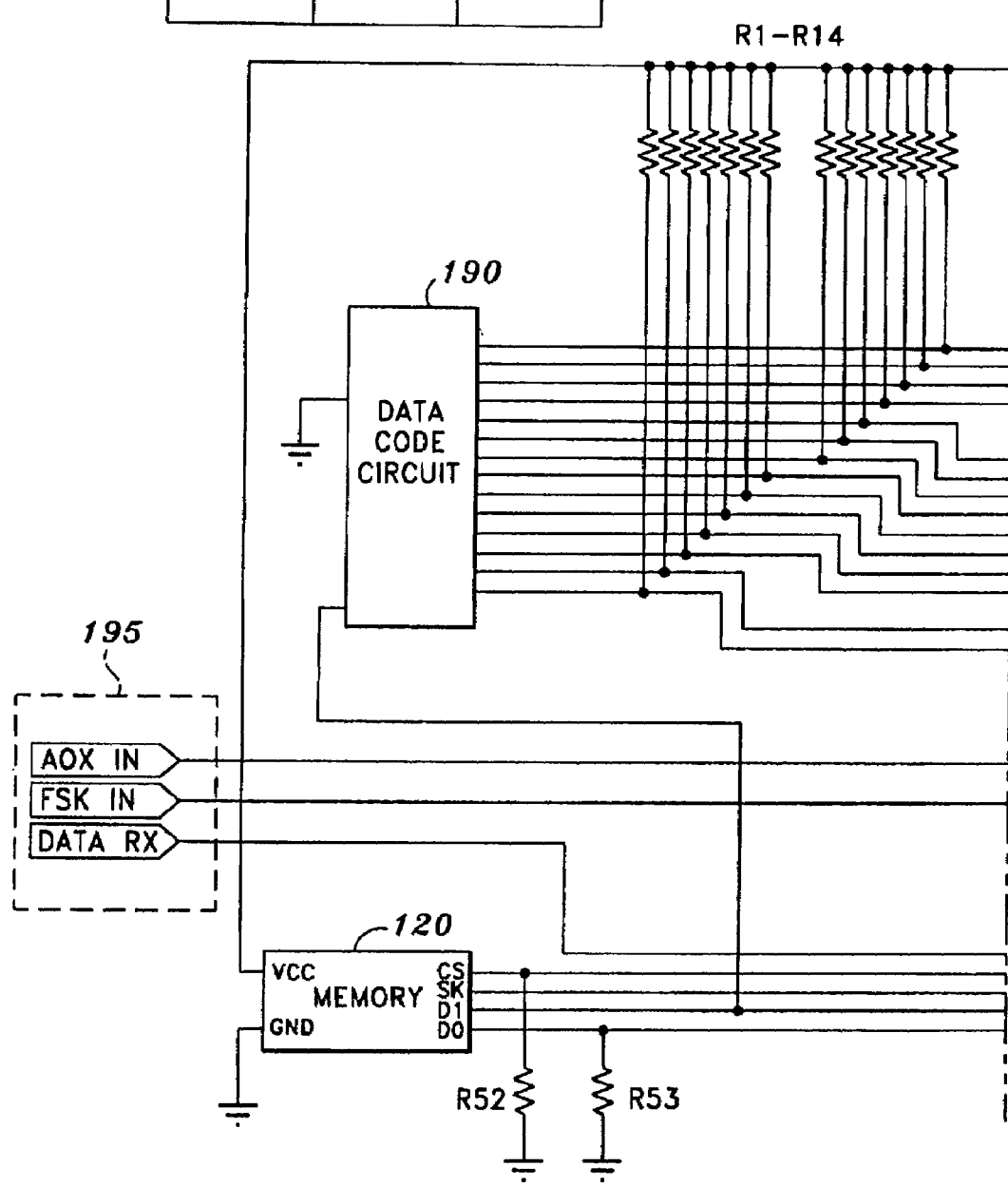

TRANSMITTER FOR OPERATING MULTIPLE DEVICES

BACKGROUND OF THE INVENTION

1. Field of the Invention

The present invention relates generally to remote control systems, and specifically to a transmitter or transceiver that is programmable and capable of operating multiple devices by transmitting multiple codes at multiple frequencies, using multiple transmission formats.

2. Background of the Invention

Transmitter-receiver controller systems are widely used for remote control and/or actuation of devices or appliances such as garage door openers, gate openers, security systems, and the like. For example, most conventional garage door opener systems use a transmitter-receiver combination to selectively activate the drive source (i.e., motor) for opening or closing the door. The receiver is usually mounted adjacent to the motor and receives a coded signal (typically radio frequency) from the transmitter. The transmitter is typically carried by a user and selectively activated by the user to open or close the garage door. These type of remote control systems typically employ VHF/UHF radio frequency transmissions.

In general, a remote control system has a remote transmitter and a receiver coupled to the device, which is to be controlled. When activated, the transmitter emits a modulated signal, which is recognized by the receiver to activate the device. In VHF/UHF-based systems, a transmitter typically emits a pulse-modulated VHF/UHF signal. The signal embodies a modulation pattern as a sequence of "signal on" and "signal off" intervals. The modulated signal emitted by the transmitter is recognized by the receiver. The modulation pattern of remote control systems is typically unique to restrict unauthorized access to the device being controlled.

Alternatively, the modulation pattern may be comprised of a rolling code signal which changes for each transmission, as a function of a predetermined algorithm. Each new rolling code is generated using a rolling code generator, where both the transmitter and its corresponding receiver will contain the same rolling code generator. In such systems, the receiver will only be activated if it receives one of a limited number of possible rolling codes from the transmitter. Since both the transmitter and the receiver are advancing through a rolling code sequence using the same rolling code engine, the transmitter will typically be able to provide an acceptable code to the receiver.

BRIEF SUMMARY OF THE INVENTION

A method and apparatus is disclosed. In one embodiment, the transmitter comprises a first switch and a memory programmed with transmission values and corresponding transmission frequencies for a plurality of receivers, where the transmission values are representative of at least one of a device code and a modulation format. In one embodiment, the transmission values include transmission values for a fixed-code type receiver and a rolling-code type receiver. The apparatus further includes a receiving circuit for receiving a sample signal having sample transmission values, and a controller coupled to the first switch, the memory and the receiving circuit. The controller compares the sample transmission values from the sample signal to the transmission values in the memory for the plurality of receivers, and associates the first switch with a first set of transmission values and corresponding transmission frequencies in memory for a first receiver of the plurality of receivers when the first set of transmission values stored in memory for the first receiver match the sample transmission values from the sample signal.

Other embodiments are disclosed and claimed herein.

DETAILED DESCRIPTION

The invention comprises a transmitter that is programmable to transmit one or more device codes, using one or more transmission formats, at one or more transmission frequencies to control one or more respective devices. In one embodiment, the transmitter includes a controller and memory for storing receiver transmission values, wherein the stored transmission values may include multiple device codes and transmission formats. In another embodiment, the transmitter has a read-to-match mode and a transmission mode. While in the transmission mode, the transmitter may load a set of transmission values and corresponding transmission frequencies into a memory from an internal storage, where the set of transmission values and corresponding transmission frequencies loaded correspond to a specific input by a user. In one embodiment, a signal based on the transmission values and corresponding transmission frequencies is then transmitted to operate one or more desired receivers. In another embodiment, the stored transmission values may be used to operate both fixed-code type receivers and rolling-code type receivers. It should be appreciated that the transmitter may also be a transceiver.

Another aspect of the invention is to provide a transmitter having a read-to-match mode, wherein the transmission values in a sampled signal may be compared and matched to the transmission values stored in a memory of the transmitter. Upon matching the transmission values in the sampled signal to one of a plurality of stored transmission values, a selected switch on the transmitter may be programmed to actuate a receiver which is responsive to the transmission values in the sampled signal.

Yet another aspect of the present disclosure is to enable the transmitter to correct or fine tune a transmission frequency at which the transmission values are being sent by comparing the transmission frequency to a reference frequency.

Figure 1A:
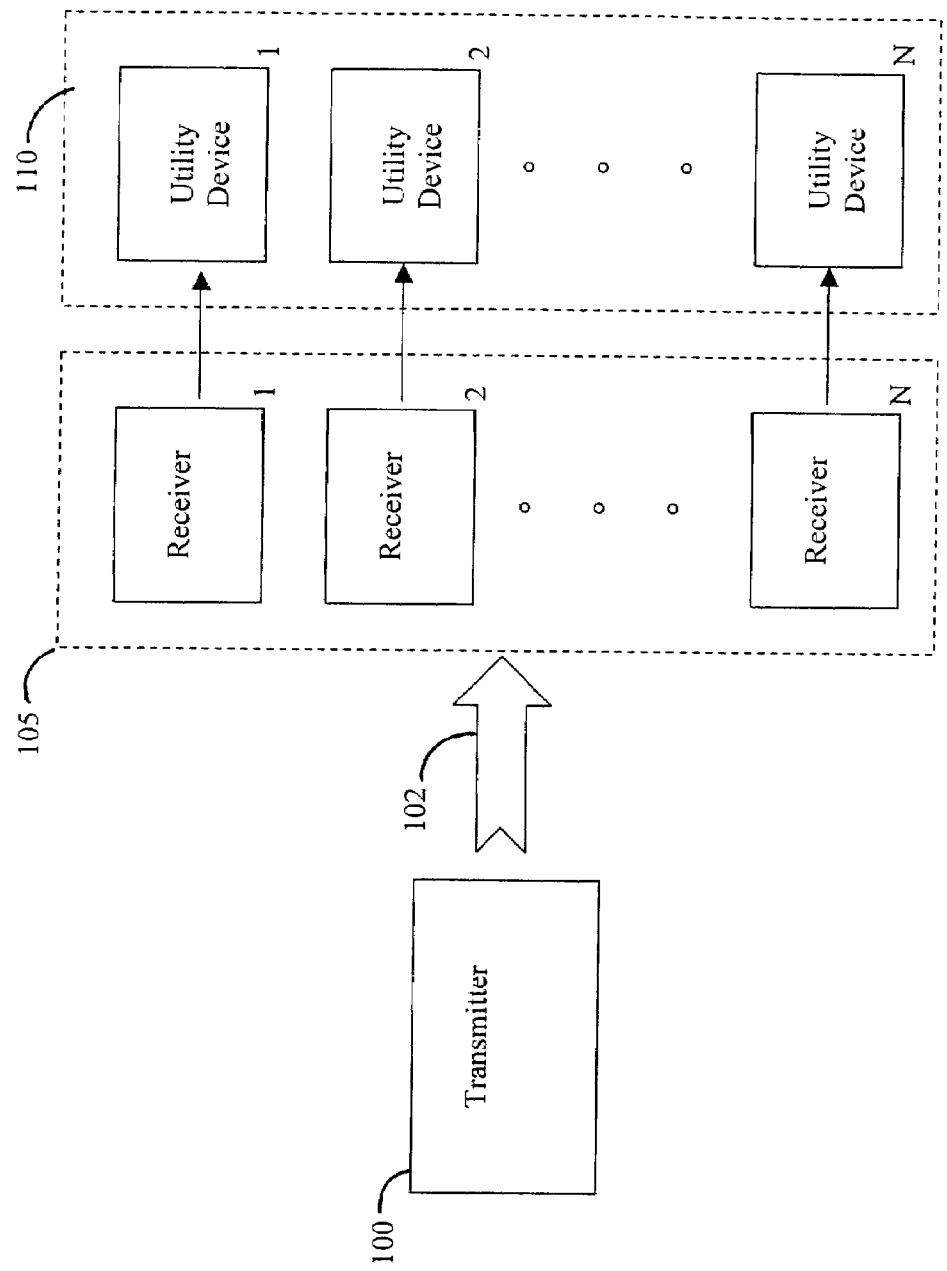
FIG. 1A is a simplified block diagram of a transmitter-receiver system consistent with the principles of the invention.

Referring now to the figures, and specifically to FIG. 1A, illustrating a system diagram of a transmitter 100 that can transmit multiple device codes using multiple transmission formats or protocols, at multiple transmission frequencies. One or more receivers 105 are adapted to receive the signals 102 from the transmitter 100, interpret the signals and produce an output signal to drive a corresponding utility device 110. The transmitter 100 of the invention is programmable to transmit one or more rolling device codes or fixed device codes using one or more transmission formats at one or more frequencies. Additionally, the transmitter 100 includes multiple switches (e.g., 4) that can be assigned to control multiple utility devices 110 via receivers 105. Thus, each switch can be assigned to transmit a signal having any combination of a device code, transmission format, and transmission frequency. In one embodiment, the transmission format is a pulse-code modulation pattern. However, in alternative embodiments, the transmission format may be any known transmission pattern, for example, frequency shift keying, pulse amplitude modulation, pulse width modulation, or a rolling code modulation pattern.

In a representative utilization, the transmitter 100 is a remote control device which can be used with a receiver 105 as part of a garage door opening system. In this representative utilization, the corresponding utility device 110 may be the garage door mechanism, including the motor, drive mechanism, lighting apparatus and/or the like. For example, the utility device 110 opens or closes a garage door when activated by a corresponding receiver 105 upon receipt of the appropriate signal from the transmitter 100. While a garage door opening mechanism is illustrative, many other types of utility devices may be controlled by such remote transmitter-receiver system such as gates, light systems, security systems, etc. In another embodiment, the transmitter 100 is a transceiver.

When activated, the programmable transmitter 100 generates a signal 102 having a predetermined transmission frequency and a unique data transmission format, where the timing parameters and modulation characteristics related to encoded data are unique to the design of the particular transmitter. As mentioned above, one or more receivers 105 are adapted to receive and decode the signals generated by the transmitter 100 to actuate a corresponding utility device 110. In one embodiment, the transmitter 100 and the receivers 105 transmit and receive at a single transmission frequency, using a single data transmission format. In alternative embodiments, multi-format and/or multi-frequency systems may be implemented. As will be discussed in more detail below, the transmission frequency at which the signal is sent may be adjusted or fine tuned so as to ensure that the signal 102 is being sent at the expected frequency.

Figure 1B:
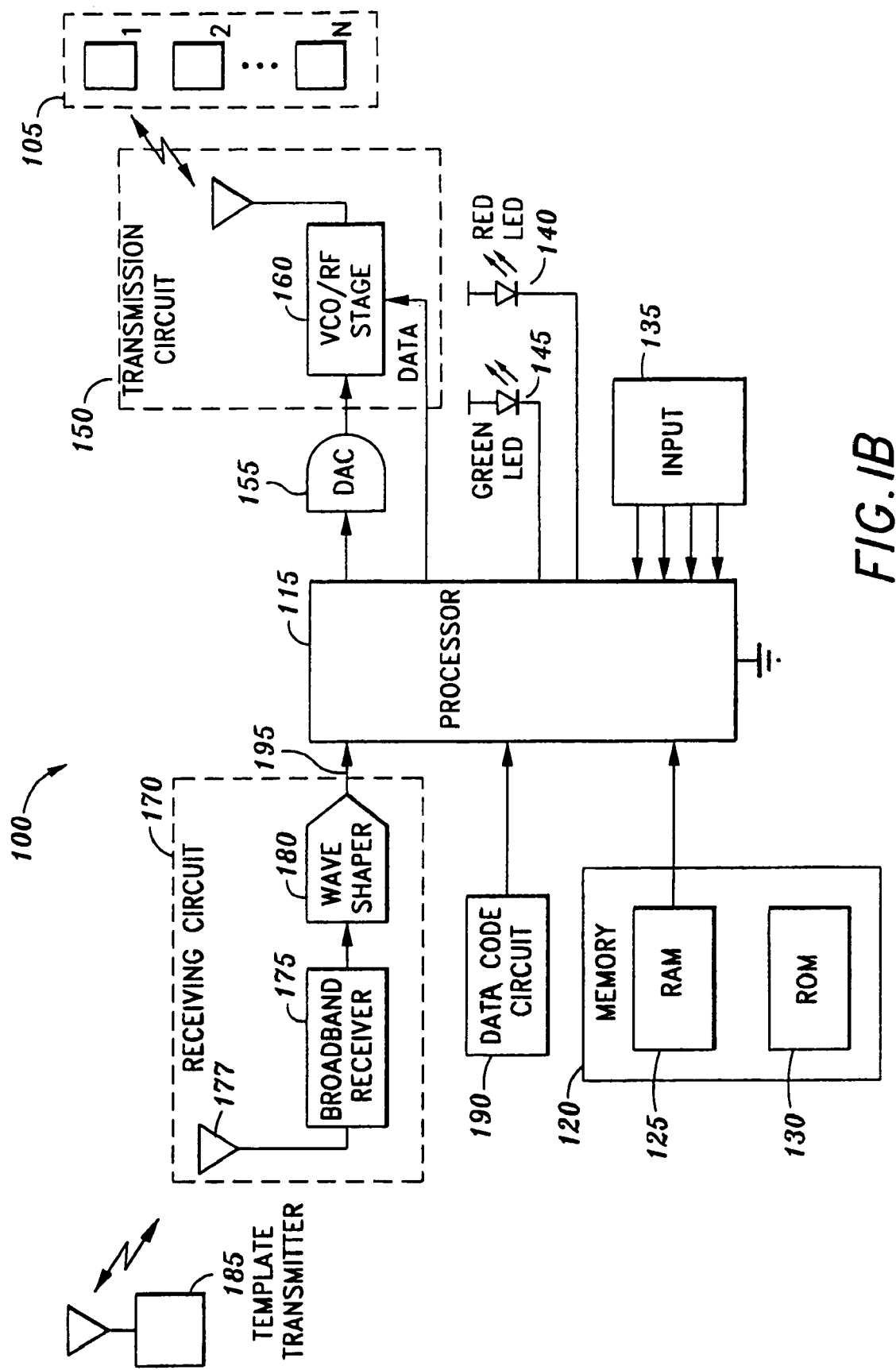
FIG. 1B illustrates a block diagram of a transmitter utilizable in the transmitter-receiver system of FIG. 1A, according to one embodiment of the invention.

FIG. 1B is a block diagram depicting a transmitter 100, according to one embodiment. Referring to FIG. 1B, the transmitter 100, which may also be referred to a transceiver, includes a processor 115, a memory 120, which includes a random-access memory (RAM) 125 and a read-only memory (ROM) 130. The processor 115 may take any form, such as a microprocessor, microcontroller, digital signal processor (DSP), reduced instruction set computer (RISC), application specific integrated circuit (ASIC), and the like. ROM 130 may include one or more of flash memories, electrically erasable programmable read-only memory (EEPROM) and non-volatile RAM (NVRAM). The ROM 130 may store the program that controls the processor 115, as well as other information including, but not limited to, (i) values representative of the pre-selected transmission frequencies, (ii) values representative of data transmission formats, (iii) device codes, (iv) rolling code settings, etc.

The transmitter 100 further includes input(s) 135, which may include an alphanumeric keypad, buttons or other known means of input. Transmitter 100 further includes light emitting diodes (LEDs) 140 and 145. In another embodiment, however, LEDs 140 and 145 may be replaced or supplemented with any type of known display device, including a liquid crystal display (LCD) screen (not shown). The transmitter of FIG. 1B further includes a transmission circuit 150, which is connected to the processor 115 via a digital-to-analog converter (DAC) 155. It should be appreciated that the transmitter 100 may further include a portable battery or other power source (not shown) which powers the transmitter 100 upon actuation of an input.

The transmission circuit 150 includes a voltage-controlled oscillator (VCO) 160 and antenna 165 for transmitting signal 102 to receivers 105. The processor 115 may produce a digital signal, which is converted to an analog voltage by DAC 155. The output from the DAC 155 may then be applied to tune VCO 160 to a desired frequency. The VCO 160, working in conjunction with antenna 165, may then be used to provide signal 102 to one or more of the receivers 105 for controlling the utility devices 110. In another embodiment, the transmission circuit 150 may be operable to transmit infrared (IR) signals.

While the present disclosure refers to transmitter 100 as being a transmitter, it should equally be appreciated that transmitter 100 may be a transceiver. To that end, transmitter 100 may further include a receiving circuit 170, comprised of an antenna 177, broadband receiver 175 and a wave shaper circuit 180. In one embodiment, the broadband receiver 175 receives an RF signal from a template transmitter 185 using antenna 177. A sample of the signal received by the broadband receiver 175, which may also include a wide-band pre-scaler circuit and an amplifier, is then provided to the input of the wave shaper circuit 180. The wave shaper circuit 180, whose output is coupled to the processor 115, may then wave shape and level shift the received sample signal so as to enable accurate reading of the signal by the processor 115.

The input 135 may include a plurality of keys or switches which may be programmed to correspond to a particular transmission format. The processor 115 may be programmed to store the transmission format corresponding to the keys of input 135 in memory 120. Once a given input 135 is programmed with a device code, modulation pattern, and data transmission frequency, actuation of the switch causes the processor 115 to retrieve the values from RAM 125 and/or ROM 130 and generate a pulse-modulated signal or FSK signal using the programmed modulation pattern at the programmed transmission frequency.

When data transmission is activated, the processor 115 retrieves the device identification code, transmission format, and values representative of a transmission frequency, assigned or associated with the switch pressed, from ROM 130. The processor 115 outputs values to the DAC 155 to control the VCO 160 to generate the transmission frequency. Consequently, a signal 102 is transmitted with the desired device code and modulation pattern, with a desired transmission frequency.

As discussed above, the ROM 130 may be used to store one or more transmission formats for operating one or more respective rolling code receivers or fixed code receivers. The stored transmission formats may further include any number of fixed code formats, including a pulse-width modulated (PWM) format or a frequency shift key (FSK) format.

The stored transmission formats may further include a Type A rolling code format and/or a Type B rolling code format. On one embodiment, the Type A and Type B rolling code transmission formats may be the rolling code formats used Chamberlain® brand rolling code transmitter-receiver systems and Genie® brand rolling code transmitter-receiver system. U.S. Pat. No. 6,956,460, entitled "Transmitter for Operating Rolling Code Receivers," which is assigned to the assignee hereof and hereby incorporated by reference, discloses a method for using a set of fixed codes to operate a rolling code receiver. This set of fixed codes, along with the device code, modulation pattern and transmission frequency, may comprise the transmission format for a rolling code transmitter.

Transmitter 100 further includes a data code circuit 190, which may be comprised of a plurality of dual in-line package (DIP) switches and/or a pin pad. A number of transmitter-receiver systems determine their modulation patterns by setting a plurality of DIP switches on the transmitter and by similarly setting a plurality of DIP switches on the corresponding receiver. In this manner, a device code, in the form of a particular DIP switch or pin pad setting, may be used to program a transmitter to be able to communicate with a particular receiver and vice versa. For convenience this DIP switch or pin pad setting will be referred to herein as the device code or the device code setting. While the data code circuit 190 may be operated by processor 115, the data code circuit 190 settings may also be manually adjusted. In one embodiment, manual adjustment of DIP switches of the data code circuit 190 may be made to set the device code setting for transmitter 100 to correspond to the settings of one of receivers 105.

Finally, receiving circuit input 195 provides the processed sample signal from receiving circuit 170 to processor 115.

Figure 2B:
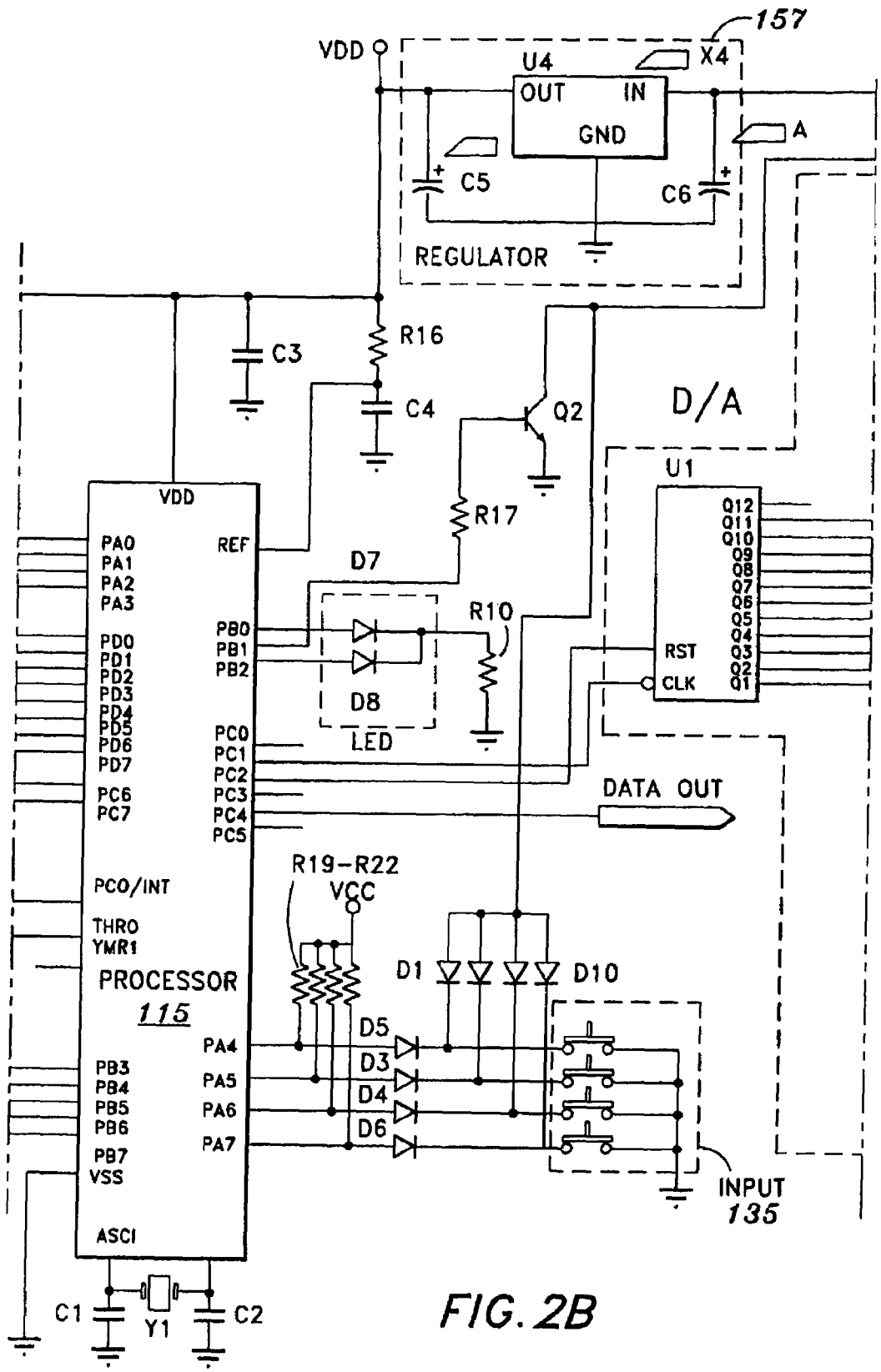
FIG. 2 is a detailed schematic of the transmitter of FIG. 1B, according to one embodiment of the present invention.
Figure 2C:
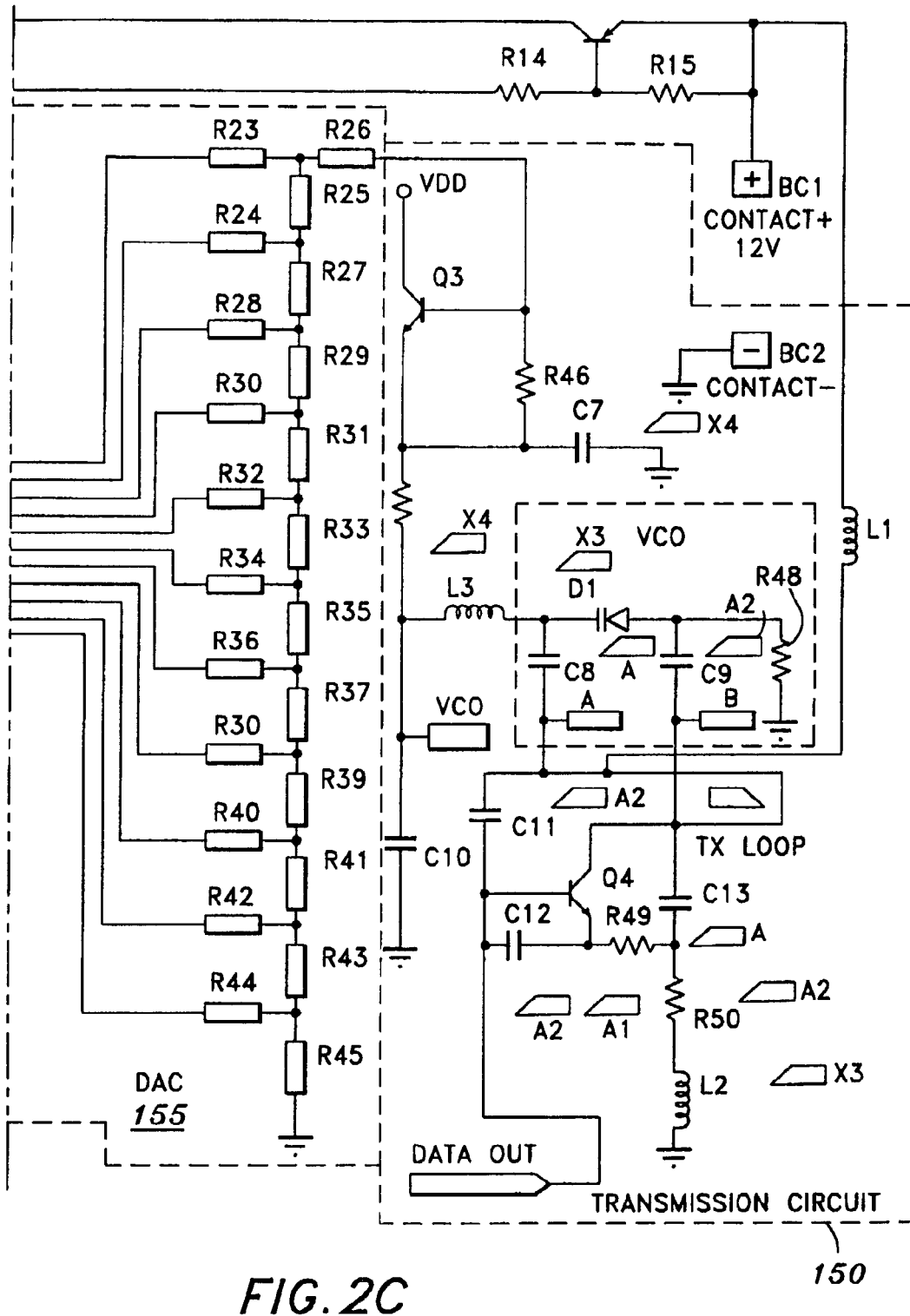

Referring now to FIG. 2, in which a detailed schematic of transmitter 100 is illustrated. FIG. 2 shows processor 115 coupled to data code circuit 190, memory 120, input 135, DAC 155 and voltage regulator 157. In addition, processor 115 is coupled to receiving circuit input 195, through which sampled signals are provided to the processor 115.

Figure 3:
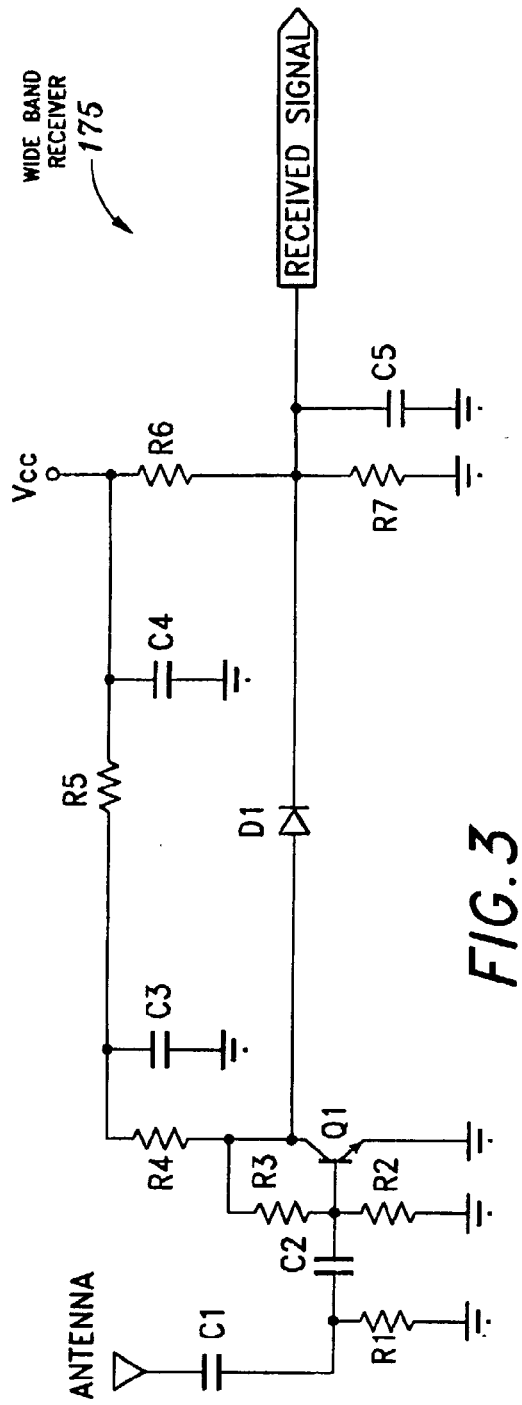
FIG. 3 illustrate a schematic of one embodiment of one aspect of the transmitter of FIG. 1B.
Figure 4:
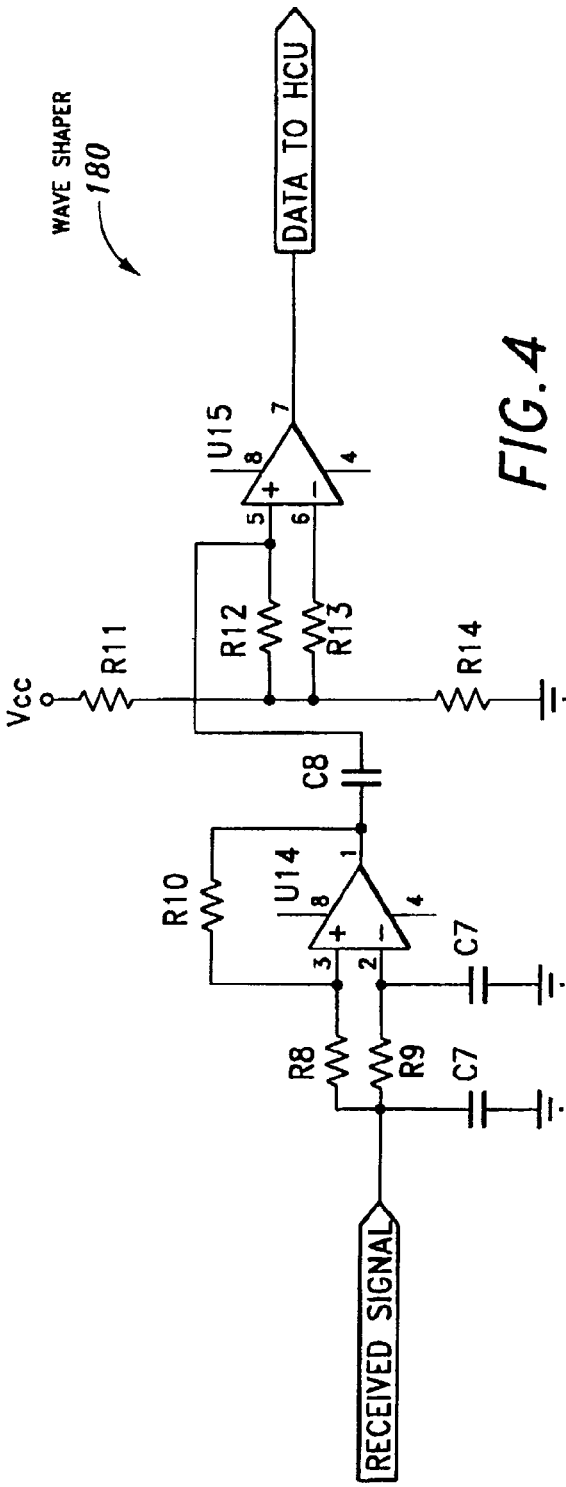
FIG. 4 illustrate a schematic of one embodiment of another aspect of the transmitter of FIG. 1B.

FIG. 3 is a schematic of broadband receiver 175. Broadband receiver 175, using antenna 177, receives an RF signal and passes it to wave shaper 180, as shown in FIG. 4. After processing the received signal, wave shaper 180 provides the signal to processor 115, via receiver circuit input 195. It should be appreciated that the received signal may be further processed by other components known in the art, such as an amplifier, before it is provided to the processor 115.

Figure 5:
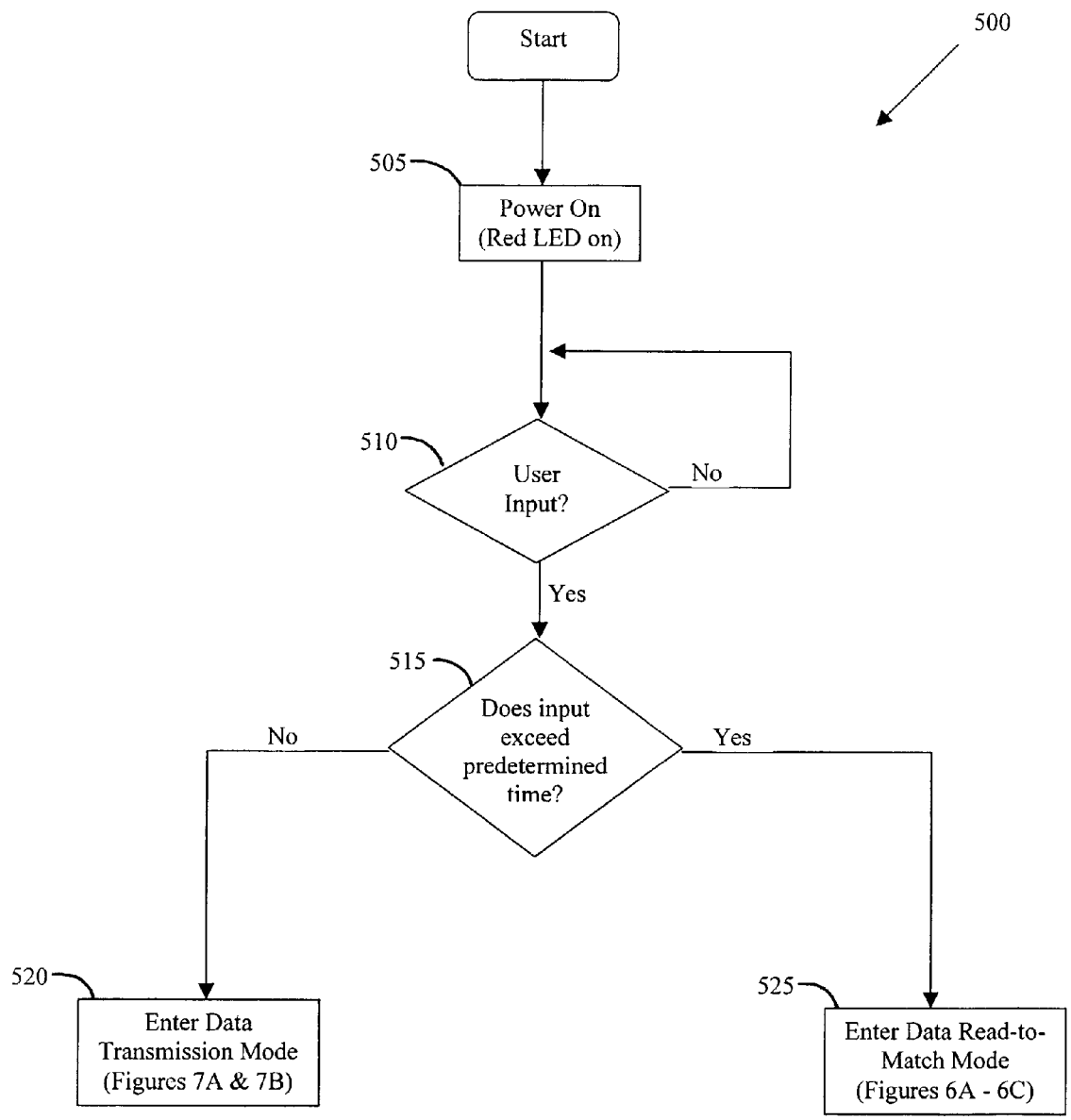
FIG. 5 illustrates a flow diagram of a process for utilizing the transmitter of FIG. 1B, according to one embodiment of the present invention.

Referring now to FIG. 5, in which a process 500 for utilizing transmitter 100 is depicted. The process begins when transmitter 100 is powered on at block 505. In the embodiment of FIG. 5, this is indicated by illuminating red LED 140. However, it should be appreciated that any number of known means of indication may be used. A determination is then made at decision block 510 as to whether there has been a user input. In one embodiment, the decision block 510 determines if a user has activated input 135, which may be comprise of one or more buttons or keys. Once a user input is detected, a determination is made at block 515 as to whether the input exceeds a predetermined time. In one embodiment, this determination is based on how long a user holds down a key/button on input 135. The predetermined time is 5 seconds, in one embodiment, but may be longer or shorter period of time. For present discussion purposes only, it will be assume that input 135 has input keys 1–N, where N is any positive nonzero integer. However, it should be appreciated that other input means may also be used, including, but not limited to, a touch screen, voice activation, etc.

If the input does not exceed the predetermined time, then the process of FIG. 5 continues to block 520 where the transmitter enters Data Transmission Mode. If, on the other hand, the input does exceed the predetermined time, then this is an indication that the user desires to enter Read-to-Match Mode and the process continues to block 525 to enter Read-to-Match Mode.

Figure 6A:
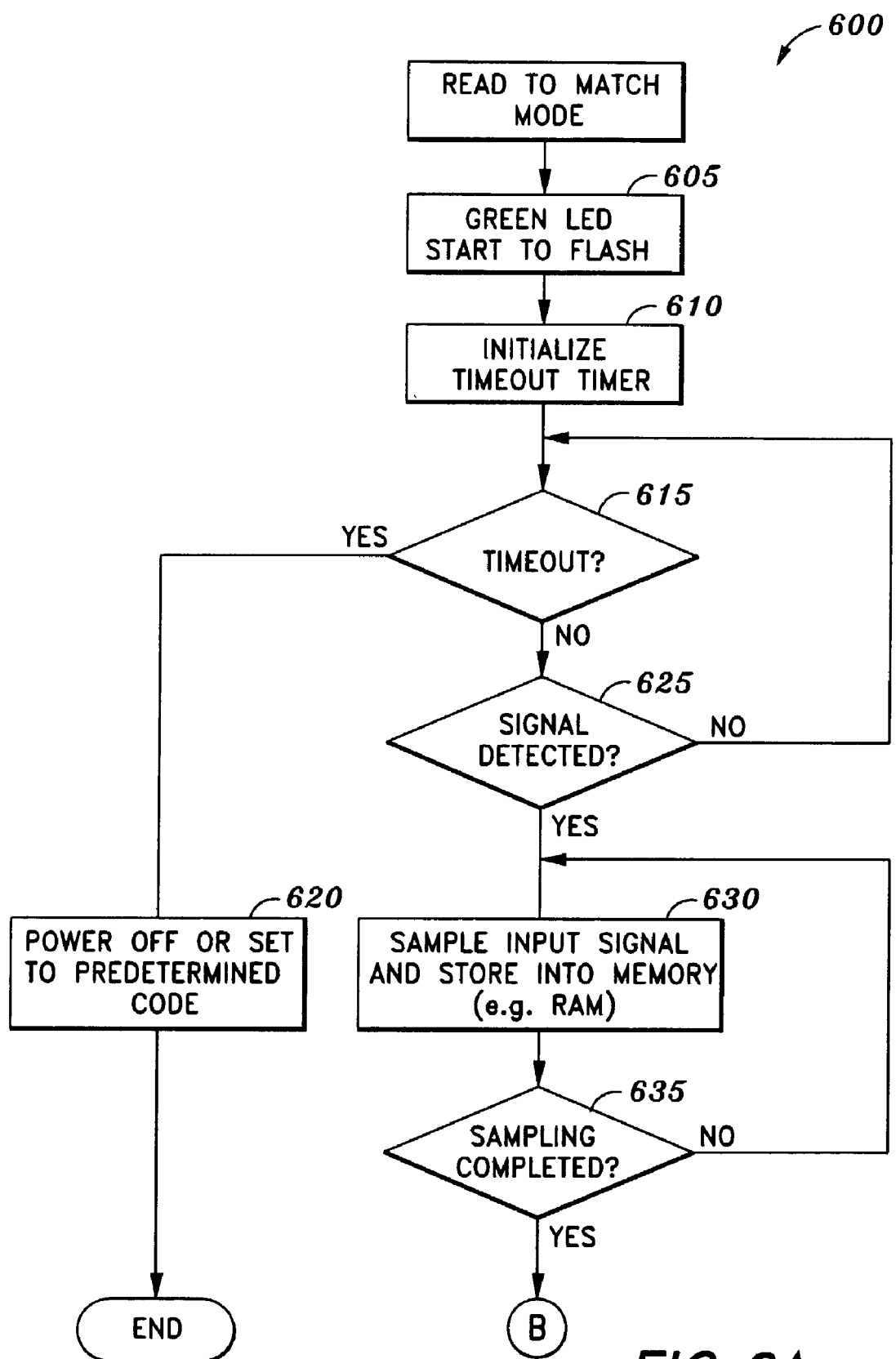
FIGS. 6A–6C is a flow diagram of one embodiment for programming a transmitter consistent with the principles of the present invention.

Assuming that there has been an input exceeding the predetermined time at block 515, entry into the Read-to-Match Mode is indicated at block 605 on FIG. 6A when the green LED 145 begins to flash, according to one embodiment. The Read-to-Match process 600 then initializes a timeout timer at block 610. In one embodiment, the timeout timer is used to exit the Read-to-Match Mode after a predetermined timeout period. In one embodiment, this predetermined timeout period is 8 seconds, although it should be appreciated that the timeout period may be a longer or shorter period of time.

Process 600 continues with decision block 615, where a determination is made as to whether process 600 has timed out (e.g., whether the predetermined timeout has elapsed). If so, process 600 continues to block 620 where the transmitter may be powered off and/or the selected input key may be set to a predetermined transmission format. In one embodiment, the predetermined transmission format is a rolling code format, such as the rolling code format provided by Skylink, of Ontario, Canada. In one embodiment, the predetermined transmission formats are based on inputs to the data code circuit 190.

Where decision block 615 determines that the timeout period has not elapsed, process 600 continues to decision block 625, where a determination is made as to whether a signal from a template transmitter 185 has been detected. It should be appreciated that the template transmitter 185 may be any rolling code or fixed code transmitter that, when activated, transmits a signal 102 which may then be received by receiving circuit 170. In particular, the received signal may be received by broadband receiver 175 and, thereafter, provided to wave shaper 180, as previously discussed.

Once a signal is detected, the signal may be sampled and temporarily held in memory at block 630. In one embodiment, the sampled signal is held in RAM 125. It should be appreciated that any known means of sampling a RF signal may be used. Once the signal sampling has been completed (as determined by block 635), process 600 continues to FIG. 6B.

Figure 6B:
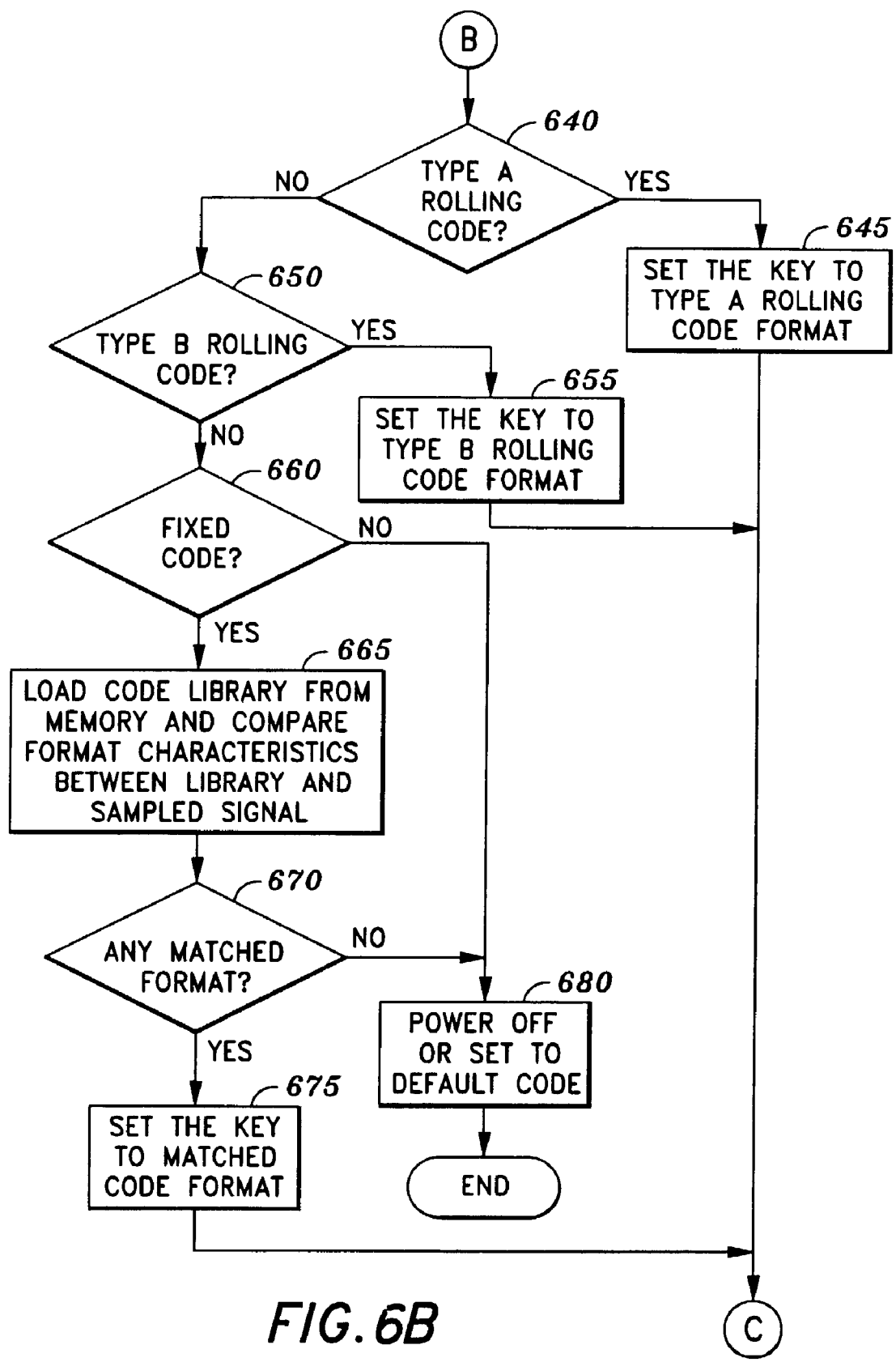

Referring now to FIG. 6B, process 600 continues with a determination, at block 640, as to whether the sampled signal corresponds to the signal of a Type A rolling code system. If so, process 600 continues to block 645 where the selected key on input 135 is set to the Type A rolling code format. Alternatively, if it is determined at block 640 that the signal sample does not correspond to the Type A rolling code format, then process 600 continues to decision block 650. At decision block 650, a determination is made as to whether the signal sample is of the Type B rolling code format. If so, then process 600 continues to block 655 where the selected key on input 135 is set to correspond to the Type B rolling code format. As mentioned previously, in one embodiment Type A and Type B rolling code formats refers to the Chamberlain® brand rolling code format and the Genie® brand rolling code format.

When a determination is made that the sample signal is of either the Type A or the Type B rolling code format, the selected key is set to that appropriate rolling code format. In one embodiment, setting an input key to a particular format consist of programming the selected key, of input 135, to be a reference pointer to preloaded data in memory 120. Thus, in the case of the rolling code formats, the selected key is set to pre-loaded rolling code data in memory 120, where the rolling code data consists of modulation pattern data, frequency data, code setting data, and other code data, as described in U.S. Pat No. 6,956,460, entitled "Transmitter for Operating Rolling Code Receivers," for activating a corresponding rolling code receiver. Process 600 would then continue to FIG. 6C, as will be discussed below in more detail.

If, on the other hand, a determination is made at decision block 650 that the signal sample is not of the Type B rolling code format, then process 600 continues to block 660, where a determination is made as to whether the signal sample is in a predetermined type of fixed code format. In one embodiment, the signal sample is checked to see if it is a pulse-width modulated (PWM) signal. If so, then process 600 may continue to block 665. At block 665, signal data may be loaded from ROM 130 into RAM 120. A comparison may then be undertaken to determine if the signal sample corresponds to any of the pre-loaded signal formats stored in transmitter 100 (block 670). Once a match is found, the selected key is set to the matching signal format in memory 120 at block 675. In addition, where it is determined that the sample signal is a frequency shift key (FSK) signal, the input key may set automatically set to refer to FSK signal data in memory 120.

Alternatively, if no match is found for the sampled signal or the sampled signal is not a fixed code signal, as determined at block 660, then process 600 continues to block 680. At block 680, the transmitter may be powered down or, alternatively, the selected key may be set to a default code format. In one embodiment, the default code format us the FSK format, while in an another embodiment the default format is the Skylink rolling code format.

Figure 6C:
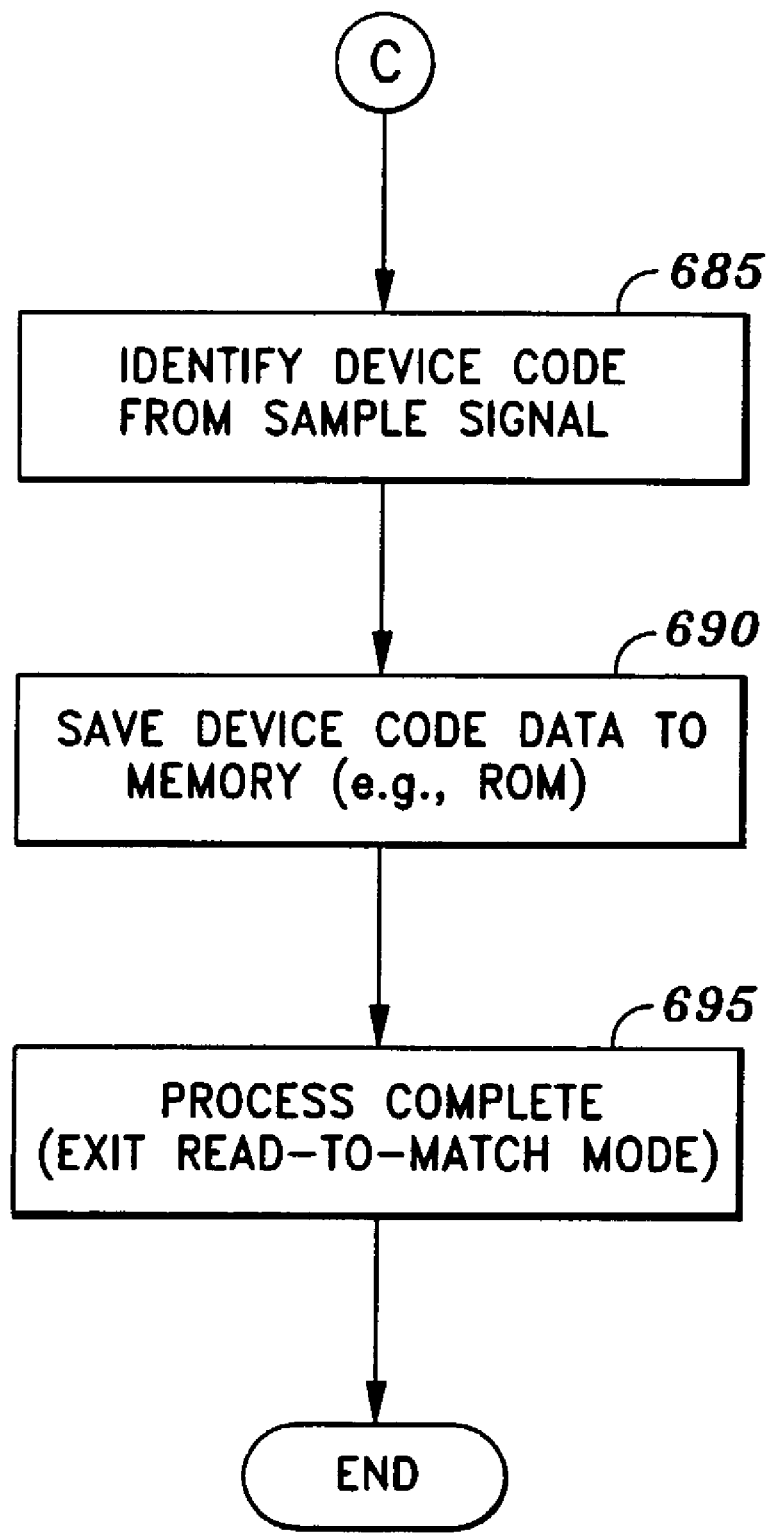

At this point, process 600 proceeds to block 685 of FIG. 6C. At block 685, any device code information in the sampled signal is identified. As discussed previously, the device code information represents the DIP switch or pin pad settings of a transmitter-receiver pair. Such device code data is then saved to memory, which in one embodiment is ROM 130 (block 690). At this point, process 600 is complete and the transmitter exits the Read-to-Match Mode at block 695.

Figure 7A:
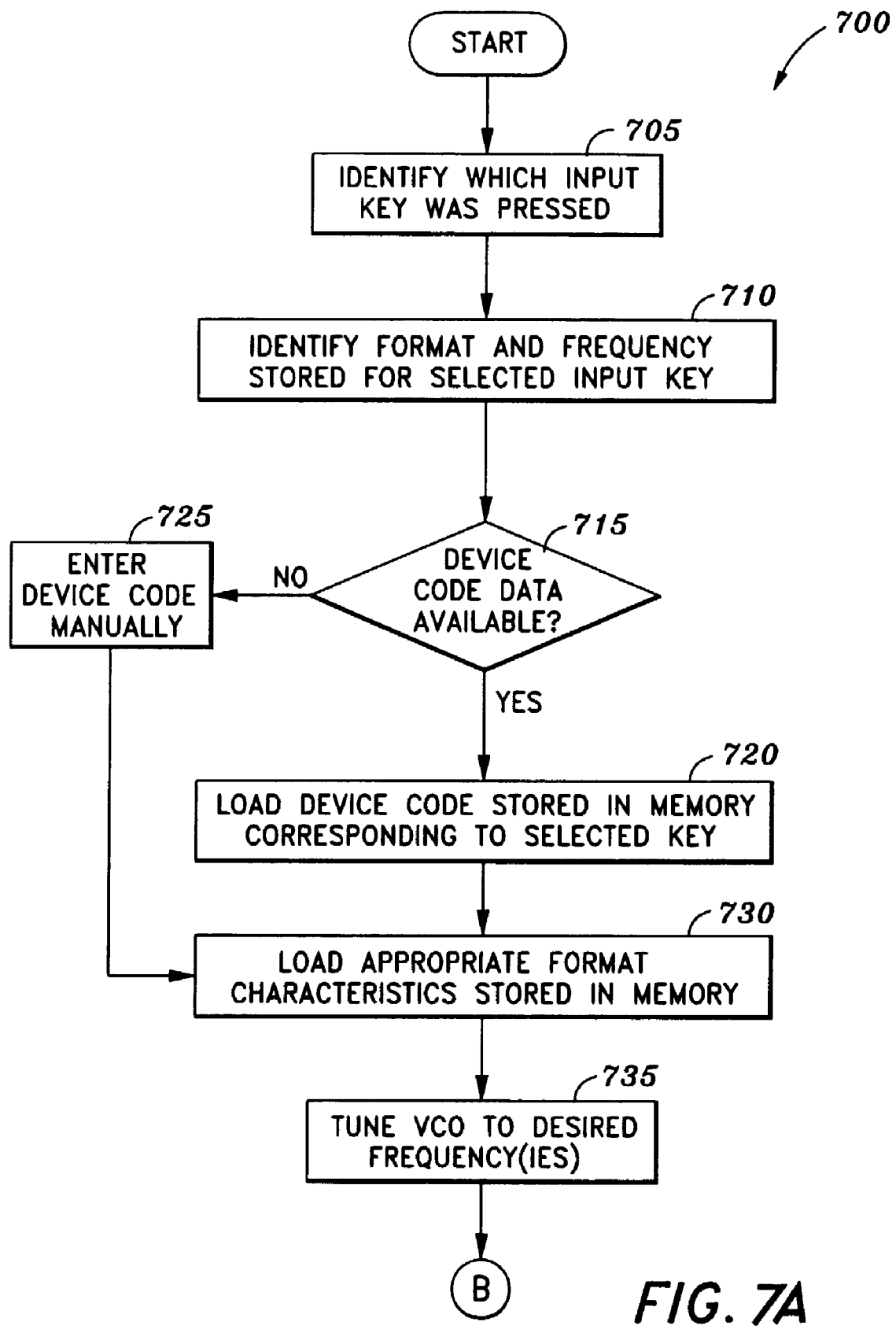
FIGS. 7A–7B illustrates a flow diagram of a data transmission process between a transmitter and receiver, according to one embodiment of the present invention.

Referring now back to block 515 of FIG. 5, if the user input does not exceed the predetermined time, then process 500 would continue to block 520, where Data Transmission Mode would be entered and Data Transmission process 700 of FIG. 7A would begin. As seen in FIG. 7A, Data Transmission process 700 begins with the identification of which input key was pressed (block 705). In one embodiment, a user selects an input key by selecting one of the keys on input 135. Where the user desires to activate a particular receiver, the user selection would correspond to an input key which has previously been programmed to activate the desired receiver. In one embodiment, the selected input key was programmed using the Read-to-Match process 600, while in another embodiment the input key was preprogrammed during manufacture.

Assuming that the user has selected to enter Data Transmission Mode by not exceeding the predetermined input time at block 515, the process continues with FIG. 7A. In particular, at block 705 a determination is made as to which key of input 135 was selected by the user. In one embodiment, each of the input keys 1–N on input 135 is programmable to generate a desired device code, using a desired modulation format, at a desired transmission frequency. Thus, the input keys can be used in conjunction with N different receivers 105 to control N different utility devices 110. For example, where there are four input keys on input 135, input keys 1 and 2 may be programmed to control two different garage door openers, input key 3 may be programmed to arm/dis-arm a security system, and input key 4 may be used to control a gate. Alternatively, more than one key may be used to control different features of a utility device 100. For example, input keys 1 and 2 may be programmed to control different zones of an alarm system, and input keys 3 and 4 may be used to control different lights within a dwelling. Many other embodiments exist for programming and usage of the input keys 1–N.

Continuing to refer to FIG. 7A, once the selected input key is determined at block 705, the corresponding modulation pattern and frequency may be identified at block 710. A determination should also be made as to whether there is a device code stored in memory 120 for the selected input key (block 715). If there is a stored device code for the selected input key of input 135, this value may be loaded into RAM 125 at block 720. If alternatively, there is no device code in memory corresponding to the selected key, then a user may be prompted to manually enter the device code via data code circuit 190 (block 725). As mentioned previously the device code may be set using the data code circuit 190, which may include a series of DIP switches or a pin pad.

Thereafter, the transmission values, such as the modulation pattern and frequency, are loaded into RAM 125 at block 730. It should be appreciated, however, that the transmission values of block 730 may also be accessed and loaded prior to the device code of block 720. In any event, the transmission values may then be used to tune the VCO to the desired frequency or frequencies at block 735.

Figure 7B:
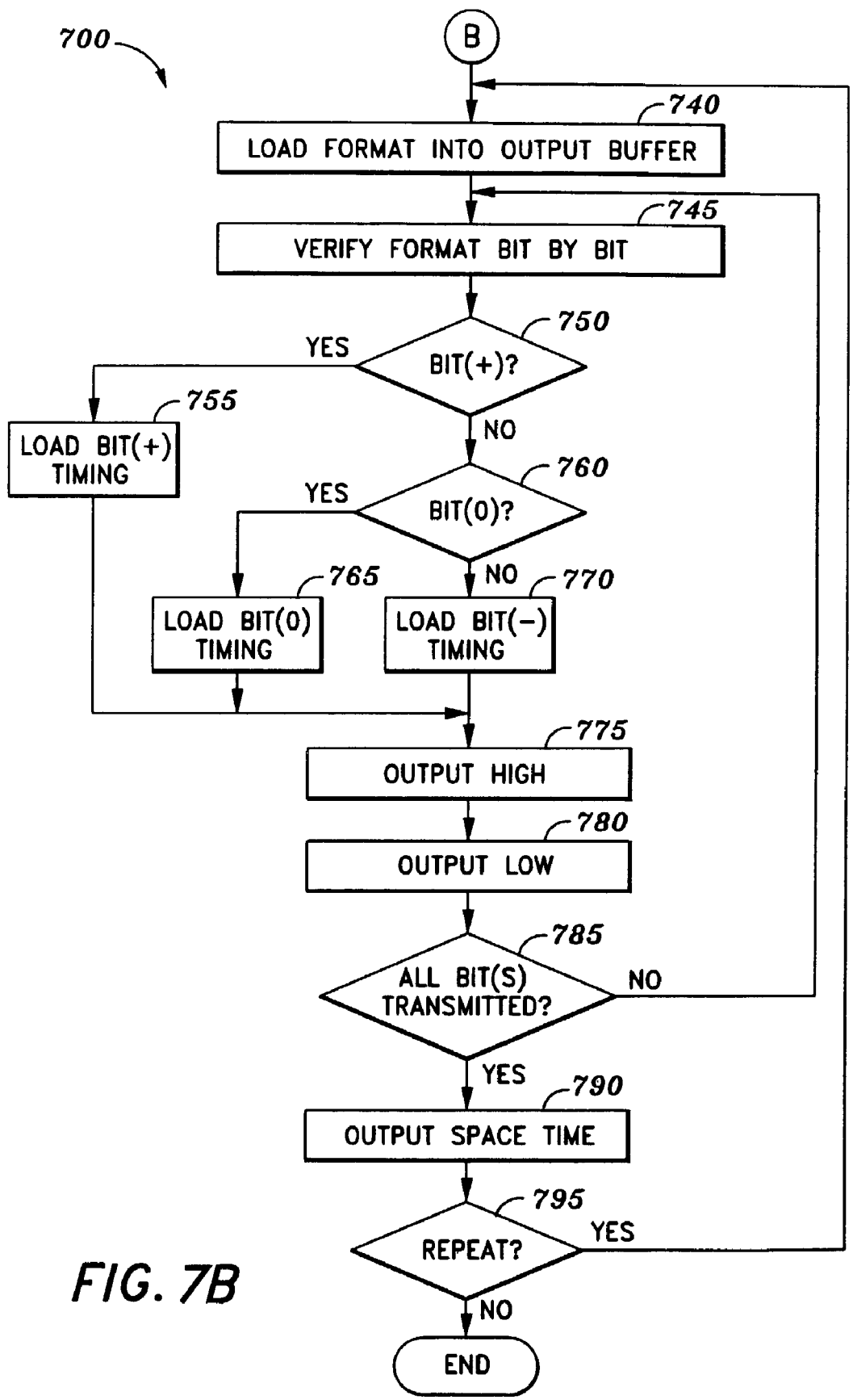

The process of FIG. 7A continues to block 740 on FIG. 7B, where the transmission format, including the modulation pattern, corresponding to the selected input key is loaded into an output buffer, which in one embodiment is part of transmission circuit 150. It should be appreciated that, in an alternate embodiment, the output buffer may be part of memory 120. However, for convenience, the following description of FIG. 7B will refer to it only as the 'output buffer.'

A bit-by-bit verification process may then be undertaken at block 745. In particular, a bit to be provided by the transmission circuit 150 as part of the output signal 102 is checked at decision block 750. If a determination is made that the bit is a positive bit, the timing for positive bits for the appropriate transmission format is loaded into the output buffer (block 755). If the bit is not a positive bit, process 700 continues to decision block 760, where the bit is checked to see if it is a neutral bit, such as may be the case for a trinary bit format. If decision block 760 determines that the bit is a neutral bit, then process 700 moves to block 765 where the timing for neutral bits is loaded into the output buffer. Similarly, where the bit is a not a neutral bit, then the timing for negative bits is loaded at block 770. The high pulses and low pulses (e.g., leading edge and trailing edge) for the output signal 102 are then transmitted at blocks 775 and 780 by the transmission circuit 150.

Decision block 785 involved a determination of whether all bits in the signal 102 have been transmitted. If not, process 700 reverts to block 745 and the verification and loading process continues for the next bit. If, on the other hand, all bits have been transmitted then process 700 continues to block 790 where the space time is output, where space time is the separation time between data transmissions. If the Data Transmission process is to be repeated, then block 795 directs process 700 back to block 740 where the transmission format may be loaded into the output buffer. If the process is not to be repeated, then process 700 ends.

As mentioned previously, another aspect of the present disclosure is for the transmitter to correct or fine tune the transmission frequency at which the transmission values are being sent by comparing the transmission frequency for the transmission values to a reference frequency. As discussed above, the signal 102 sent by the transmitter 100 is comprised of the desired transmission format and is sent at one or more frequencies based on the predetermined transmission frequencies stored in memory 120. In one embodiment, the predetermined transmission frequencies correspond to the frequencies used by particular manufacturers for particular models of receivers.

However, due to the potential presence of environmental factors that may tend to affect RF signal transmissions, the actual frequency at which the transmitter 100 is sending the signal 102 (or the actual frequency at which the signal 102 is being received) may not correspond to the predetermined frequency for the particular transmission format being sent. Thus, in one embodiment, the transmitter 100 compares the actual transmission frequency of signal 102 to a predetermined reference signal. While in one embodiment, the reference signal may be based on the clock frequency for processor 115, it should be appreciated that any transmission frequency may be used.

The process of detecting and correcting a degraded transmission frequency begins when the transmitter 100 sends a signal 102, comprised of the selected transmission format, at its pre-determined transmission frequency. As mentioned previously, the transmitter 100 is also a transceiver in one embodiment. Thus, in addition to having one or more of the receivers 105 receive the signal 102, the signal 102 may also be received by the receiving circuit 170. In one embodiment, the transmitter 100 saves the actual received frequency of the signal 102 to memory 120. Thereafter, processor 115 may undertake to compare the frequency of the received signal 102 to the frequency of the reference signal. It should be appreciated that this comparison function may be performed in software or in hardware. When implemented in hardware, an analog-to-digital converter ("ADC") may be used to provide a digitized signal to the processor 115.

Given that the signal 102 should be received at the predetermined frequency for the selected transmission format, comparing the actual frequency of the received signal 102 to the reference frequency should produce a distinct result if there has been no signal degradation. By way of a non-limiting example, assume the reference frequency is 300 MHz and the transmission frequency of the selected transmission format is 390 MHz. In this case, a comparison of the received transmission frequency and the reference frequency should yield a net difference of 90 MHz. Thus, where the frequency comparison produces a net frequency difference of 90 MHz, no adjustment is needed since the signal 102 is being received at the correct predetermined transmission frequency. However, where the comparison yields a different result (e.g., difference of 92 MHz), processor 115 can then direct VCO 160 to adjust the transmission frequency so as to correct this detected variance. In another embodiment, rather than adjust the VCO 160, the predetermined transmission frequency in memory 120 for the given transmission format is updated.

Continuing with the above example, the next time the transmitter 100 sends the particular selected transmission format, it will send it at a frequency of 388 MHz, rather than the predetermined transmission frequency of 390 MHz. As before, transmitter 100 will undertake to compare the frequency at which the transmission format is received to the frequency of the reference signal. If this comparison yields a net difference of 90 MHz, then no further adjustment instruction need be provided to the VCO 160 (or no further updating of the predetermined transmission frequency need be made). If, on the other hand, there continues to be a net difference of more or less than 90 MHz, the VCO 160 will further adjust the transmission frequency for the particular transmission format for subsequent transmission. This iterative process continues until the net difference between the transmission frequency and reference frequency converges to 90 MHz.

It should be appreciated that the frequencies used in this example are for illustration only. It should further be appreciated that it may be desirable to set a tolerance for the net frequency difference. In one embodiment, the tolerance is plus or minus 1 MHz. In another embodiment, the tolerance is set at between 0.1 and 1.0 MHz. If the computed net difference is within the set tolerance range, no further adjustment to the VCO 160 (or updating of the predetermined transmission frequency) will be made, according to one embodiment.

While the preceding description has been directed to particular embodiments, it is understood that those skilled in the art may conceive modifications and/or variations to the specific embodiments and described herein. Any such modifications or variations which fall within the purview of this description are intended to be included therein as well. It is understood that the description herein is intended to be illustrative only and is not intended to limit the scope of the invention. Rather the scope of the invention described herein is limited only by the claims appended hereto.

What is claimed is:

1. A method, comprising:
   receiving a sample signal using a receiving circuit of a transceiver, said sample signal having sample transmission values;
   comparing the sample transmission values of the sample signal to transmission values stored in a memory of the transceiver, said transmission values stored in the memory to correspond to a plurality of receivers;
   associating a first switch of the transceiver with a first set of transmission values and corresponding transmission frequency in memory for a first receiver of the plurality of receivers when the first set of transmission values stored in memory for the first receiver match the sample transmission values from the sample signal;
   retrieving, upon detecting a user selection of the first switch, the first set of transmission values and corresponding transmission frequency stored in memory for the first receiver, and causing a signal to be transmitted at a predetermined frequency, said signal capable of activating the first receiver;
   comparing an actual signal frequency for the signal, as received by the receiving circuit, to a reference frequency; and
   adjusting the predetermined frequency of the signal when the actual signal frequency and the reference frequency differ by other than a predetermined difference.

2. The method of claim 1, when said reference frequency is based on a processor clock frequency.

3. The method of claim 1, wherein comparing an actual signal frequency further comprises measuring a frequency at which the signal is received by the receiving circuit.

4. The method of claim 1, wherein adjusting the predetermined frequency comprises adjusting a voltage-controlled oscillator of the transceiver circuit.

5. The method of claim 1, wherein said signal is transmitted using an output circuit of the transceiver.

6. The method of claim 1, wherein the first receiver is one of a fixed-code type receiver and a rolling-code type receiver.

7. The method of claim 1, wherein the memory of one of an electrically erasable programmable read only memory, a non-volatile random access memory and a flash memory.

8. A transceiver, comprising:
a first switch;
a receiving circuit for receiving a sample signal having sample transmission values;
a memory including a plurality of transmission values that correspond to a plurality of receivers; and
a controller coupled to the first switch, the receiving circuit and the memory, the controller to (i) compare the sample transmission values in the sample signal the plurality of transmission values stored in the memory, (ii) associate the first switch with a first set of transmission values and corresponding transmission frequency for a first receiver of the plurality of receivers when the first set of transmission values stored in memory for the first receiver match the sample transmission values from the sample signal; (iii) cause a signal to be transmitted at a predetermined frequency, said signal capable of activating the first receiver, (iv) compare an actual signal frequency for the signal, as received by the receiving circuit, to a reference frequency, (v) and adjust the predetermined frequency of the signal when the actual signal frequency and the reference frequency differ by other than a predetermined difference.

9. The transceiver of claim 8, when said reference frequency is based on a processor clock frequency.

10. The transceiver of claim 8, wherein said controller is further to measure a frequency at which the signal is received by the receiving circuit.

11. The transceiver of claim 8, wherein to adjust the predetermined frequency, said controller is to adjust a voltage-controlled oscillator of the transceiver circuit.

12. The transceiver of claim 8, further comprising an output circuit for transmitting said signal.

13. The transceiver of claim 8, wherein the first receiver is one of a fixed-code type receiver and a rolling-code type receiver.

14. The transceiver of claim 8, wherein the memory of one of an electrically erasable programmable read only memory, a non-volatile random access memory and a flash memory.

* * * * *